US008757261B2

(12) United States Patent
Weaver et al.

(10) Patent No.: US 8,757,261 B2
(45) Date of Patent: Jun. 24, 2014

(54) METHODS AND COMPOSITIONS FOR CLAY CONTROL

(75) Inventors: Jimmie D. Weaver, Duncan, OK (US); Philip D. Nguyen, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 174 days.

(21) Appl. No.: 13/106,382

(22) Filed: May 12, 2011

(65) Prior Publication Data

US 2012/0285689 A1 Nov. 15, 2012

(51) Int. Cl.
*E21B 43/26* (2006.01)
*E21B 43/22* (2006.01)
*C09K 8/66* (2006.01)
*C09K 8/60* (2006.01)
*C09K 8/68* (2006.01)
*C09K 8/57* (2006.01)

(52) U.S. Cl.
CPC ... *C09K 8/57* (2013.01); *C09K 8/66* (2013.01); *C09K 8/607* (2013.01); *C09K 8/68* (2013.01); C09K 2208/12 (2013.01); *C09K 8/608* (2013.01)
USPC ...... 166/295; 166/280.1; 166/300; 166/308.2

(58) Field of Classification Search
CPC ........ C09K 8/68; C09K 208/30; C09K 8/685; C09K 88/52; C09K 2208/26; C09K 2208/10; C09K 8/57; C09K 8/607; C09K 22/12; E21B 43/25; E21B 43/16
USPC ................. 166/292, 280.2, 280.1, 295, 305.1
See application file for complete search history.

(56) References Cited

U.S. PATENT DOCUMENTS

| | | | |
|---|---|---|---|
| 3,208,528 | A | 9/1965 | Elliott et al. |
| 3,346,047 | A | 10/1967 | Townsend et al. |
| 4,031,959 | A | 6/1977 | Henderson |
| 4,160,483 | A | 7/1979 | Thomas et al. |
| 4,230,183 | A | 10/1980 | Kalfoglou |
| 4,366,071 | A | 12/1982 | McLaughlin et al. |
| 4,366,072 | A | 12/1982 | McLaughlin et al. |
| 4,366,073 | A | 12/1982 | McLaughlin et al. |
| 4,366,074 | A | 12/1982 | McLaughlin et al. |
| 4,374,739 | A | 2/1983 | McLaughlin et al. |
| 4,393,939 | A | 7/1983 | Smith et al. |
| 4,440,649 | A | 4/1984 | Loftin et al. |
| 4,447,342 | A | 5/1984 | Borchardt et al. |

(Continued)

OTHER PUBLICATIONS

Cabot Specialty Fluids, Formate Technical Manual, Compatibilities and Interactions, Section B11, Compatibility with Shale. Version 1, pp. 1-12, Feb. 2010.

(Continued)

*Primary Examiner* — Zakiya W Bates
*Assistant Examiner* — Silvana Runyan
(74) *Attorney, Agent, or Firm* — McDermott Will & Emery LLP; Craig W. Roddy

(57) ABSTRACT

Stabilizing a subterranean formation containing water-sensitive clays with methods including introducing a leading-edge fluid comprising a first base fluid and a first clay stabilizer solution wherein the first clay stabilizer is present in the first base fluid at a first concentration; and then introducing a treatment fluid comprising a second base fluid and a second clay stabilizer solution wherein the second clay stabilizer is present in the second base fluid at a second concentration, wherein the first concentration of clay stabilizer solution is higher than the second concentration of clay stabilizer solution.

20 Claims, 2 Drawing Sheets

(56) References Cited

U.S. PATENT DOCUMENTS

| | | | |
|---|---|---|---|
| 4,460,483 A | | 7/1984 | Weaver |
| 4,462,718 A | * | 7/1984 | McLaughlin et al. ........ 405/264 |
| 4,480,696 A | | 11/1984 | Almond et al. |
| 4,526,693 A | | 7/1985 | Son et al. |
| 4,536,297 A | | 8/1985 | Loftin et al. |
| 4,536,303 A | | 8/1985 | Borchardt |
| 4,536,305 A | | 8/1985 | Borchardt et al. |
| 4,558,741 A | | 12/1985 | Borchardt et al. |
| 4,647,859 A | | 3/1987 | Son et al. |
| 4,673,040 A | | 6/1987 | Sydansk |
| 4,693,639 A | | 9/1987 | Hollenbeak et al. |
| 4,828,726 A | * | 5/1989 | Himes et al. .................. 507/240 |
| 4,842,073 A | | 6/1989 | Himes et al. |
| 4,875,809 A | | 10/1989 | Csajtai et al. |
| 5,089,151 A | * | 2/1992 | Hall et al. .................... 507/240 |
| 5,097,904 A | | 3/1992 | Himes |
| 5,135,577 A | | 8/1992 | Brothers |
| 5,197,544 A | | 3/1993 | Himes |
| 5,380,706 A | | 1/1995 | Himes et al. |
| 5,908,073 A | | 6/1999 | Nguyen et al. |
| 5,921,317 A | | 7/1999 | Dewprashad et al. |
| 6,702,044 B2 | | 3/2004 | Reddy et al. |
| 6,823,940 B2 | | 11/2004 | Reddy et al. |
| 6,837,316 B2 | | 1/2005 | Reddy et al. |
| 6,848,519 B2 | | 2/2005 | Reddy et al. |
| 7,063,154 B2 | | 6/2006 | Wilson et al. |
| 7,066,284 B2 | | 6/2006 | Wylie et al. |
| 7,196,040 B2 | * | 3/2007 | Heath et al. .................. 507/219 |
| 7,225,879 B2 | | 6/2007 | Wylie et al. |
| 7,341,117 B2 | | 3/2008 | Wylie et al. |
| 7,571,777 B2 | | 8/2009 | Wylie et al. |
| 7,673,686 B2 | | 3/2010 | Nguyen et al. |
| 7,740,071 B2 | | 6/2010 | Smith et al. |
| 8,371,382 B2 | | 2/2013 | Dusterhoft et al. |
| 8,393,394 B2 | | 3/2013 | Dusterhoft et al. |
| 2003/0054962 A1 | | 3/2003 | England et al. |
| 2004/0235677 A1 | | 11/2004 | Nguyen et al. |
| 2007/0029085 A1 | * | 2/2007 | Panga et al. ................... 166/263 |
| 2009/0151943 A1 | * | 6/2009 | Nguyen et al. ............. 166/280.1 |
| 2009/0205830 A1 | | 8/2009 | Nguyen et al. |
| 2009/0308616 A1 | | 12/2009 | Wylie et al. |
| 2011/0240291 A1 | | 10/2011 | Rickman et al. |
| 2012/0285689 A1 | | 11/2012 | Weaver et al. |
| 2012/0298368 A1 | | 11/2012 | Weaver |
| 2013/0048282 A1 | | 2/2013 | Adams et al. |

OTHER PUBLICATIONS

International Search Report and Written Opinion for PCT/GB2012/000431 dated Sep. 5, 2012.
International Search Report and Written Opinion for PCT/US2012/051688 dated Feb. 4, 2013.
Halliburton, "Material Safety Sheet Cla-Web," XP002685792, URL:http://www.michigan.gov/documents/deq/Hubell_MSDS2011-11-17_368902_7.pdf retried on Oct. 23, 2012.
Halliburton, "Cla-Web Damage Control," XP002685793, URL:http://www.halliburton.com/public/pe/contents/Data_Shets/web/H/H08481.pdf retrieved on Dec. 23, 2012.

* cited by examiner

METHODS AND COMPOSITIONS FOR CLAY CONTROL

BACKGROUND

The present invention relates to methods for treating a subterranean formation in order to stabilize water-sensitive clays and migrating fines.

The recovery of fluids such as oil and gas from subterranean formations has been troublesome in formations that contain water-sensitive minerals, e.g., water-swellable clays, such as clays in the smectite group, and fines capable of migrating when disturbed, such as silica, iron minerals, and alkaline earth metal carbonates. The terms "clays" and "water-sensitive clays" are used herein interchangeably to generally indicate water-sensitive that, when contacted by aqueous fluids in disequilibrium with the minerals in the formation, tend to swell and/or migrate. Thus, the use of aqueous fluids such as injection fluids, drilling muds, and stimulation fluids in such formations may be problematic as the resulting swelling and migration tends to block passageways to the wellbore, thereby causing a loss in permeability of the formation.

This loss in permeability impairs the flow of fluid through the wellbore and, in some cases may even completely block the flow of fluids through portions of the formation. Loss in permeability often leads to a decrease in the rate of recovery of the well. Moreover, migrating clays can be produced with the formation fluids, thereby presenting abrasion and other problems with the production equipment.

In an effort to overcome these problems, various methods have been developed for treating subterranean formations to stabilize the clays against swelling and/or migrating. For example, it has been common practice to add salts to aqueous drilling fluids. The salts adsorb to the clay surfaces in an ion exchange process that can reduce the swelling and/or migration of the clays. Another method used to deter migration is to coat the region with a polymer and/or a consolidating resin in order to physically block the migration of the clays. The term "clay stabilizer solution" as used herein refers to any solution used to stabilize clay within a subterranean formation against clays swelling and/or migrating. The term "stabilizing components" as used herein refers to the stabilizing components of a clay stabilizer solution including, but not limited to, salts, polymers, resins, soluble organic stabilizing compounds, and combinations thereof.

When a clay stabilizer solution is exposed to water-sensitive clays, the stabilizing components are consumed by the clays through known mechanisms including adsorption, ion exchange, and chemical reaction. As the concentration of the stabilizing components decreases in the remaining solution, untreated water-sensitive clays are exposed to aqueous fluids which promotes swelling and migration. Current state-of-the-art implementation of clay stabilizer solutions call for injection of a single bolus of a relatively high concentration of clay stabilizer solution into the subterranean formation. Using such a method results in the depletion of clay stabilizing components most notably at the leading-edge of the clay stabilizer solution as the solution migrates through the subterranean formation.

SUMMARY OF THE INVENTION

The present invention relates to methods for treating a subterranean formation in order to stabilize water-sensitive clays and migrating fines.

A method of stabilizing a subterranean formation containing water-sensitive minerals comprising: introducing a leading-edge fluid comprising a first base fluid and a first clay stabilizer solution wherein the first clay stabilizer is present in the first base fluid at a first concentration; and then introducing a treatment fluid comprising a second base fluid and a second clay stabilizer solution wherein the second clay stabilizer is present in the second base fluid at a second concentration. The first concentration of clay stabilizer solution is higher than the second concentration of clay stabilizer solution.

A method of stabilizing a subterranean formation containing water-sensitive minerals comprising: introducing a leading-edge fluid into a subterranean formation at above the matrix pressure, wherein the leading-edge fluid comprises a first base fluid and a first clay stabilizer solution and wherein the first clay stabilizer is present in the first base fluid at a first concentration; and then introducing a treatment fluid into the subterranean formation at above the matrix pressure, wherein the treatment fluid comprises a second base fluid and a second clay stabilizer solution and wherein the second clay stabilizer is present in the second base fluid at a second concentration. The first concentration of clay stabilizer solution is higher than the second concentration of clay stabilizer solution.

A method of stabilizing a subterranean formation containing water-sensitive minerals comprising: introducing a leading-edge fluid comprising a concentrated clay stabilizer solution above the matrix pressure into the subterranean formation to inhibit clay swelling in the subterranean formation and then introducing a fracturing fluid comprising a clay stabilizer solution into the subterranean formation to fracture the subterranean formation and to inhibit clay swelling of the fractured subterranean formation. The concentration of the clay stabilizer solution is prepared in fresh water at a concentration from about 0.1% to about 15% v/v of the leading-edge fluid; and the concentration of the clay stabilizer solution is prepared in fresh water at a concentration from about 0.001% to about 5% v/v of the fracturing fluid. The clay stabilizer solution is the same chemical composition in the leading-edge fluid and fracturing fluid.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to those skilled in the art and having the benefit of this disclosure.

DETAILED DESCRIPTION

Figure 1A:
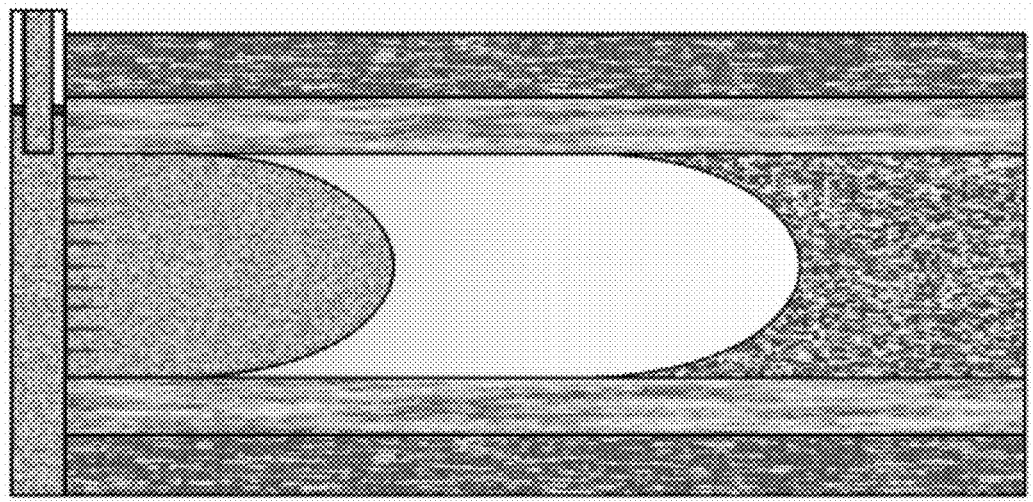
FIG. 1a is a cross-sectional representation of a subterranean reservoir that has received a bolus injection of clay stabilizer solution at a single concentration by current state-of-the-art methods.

The present invention relates to methods for treating a subterranean formation in order to stabilize water-sensitive clays and migrating fines. The methods presented herein aim to mitigate the damage a depleted leading-edge of a clay stabilizer solution can cause to a subterranean formation containing water-sensitive clays.

Of the many advantages of the present invention, the present invention provides a method yielding clay stabilization against swelling and fine migration that penetrates deeper into the subterranean formation while decreasing the overall concentration of stabilizing components. Reduction in the amount of stabilizing components used can result in a significant cost savings for the operator and may help reduce the environmental impact of the treatment.

The compositions and methods of the present invention may be used in subterranean formations containing water-sensitive clays and/or fines that include silica; iron minerals; alkaline earth metal carbonates, feldspars, biotite, illite, and chlorite; smectite clays such as montmorillonite, beidellite, nontronite, saponite hectorite and sauconite; kaolin clays such as kaolinite, nacrite, dickite, endellite and halloysite; illite clays such as hydrobiotite, glauconite and illite; chlorite clays such as chlorite, greenalite and chamosite; other clay minerals not belonging to the above groups such as vermiculite, palygorskite, sepiolite; mixed-layer (both regular and irregular) varieties of the above minerals; and combinations thereof.

Some suitable methods of the present invention comprise placing a leading-edge fluid comprising a concentrated clay stabilizer solution into the subterranean reservoir below matrix pressure. Then, a fracturing fluid comprising a clay stabilizer solution is introduced into the subterranean reservoir. The fracturing fluid maintains existing clay stabilization, and inhibits swelling of the clay newly exposed during fracture.

Some suitable methods for stabilizing a formation containing water-sensitive minerals comprise the following steps. First, a leading-edge fluid comprising a concentrated clay stabilizer solution is introduced into the subterranean reservoir at or below matrix pressure. Then, a fracturing fluid comprising a clay stabilizer solution is introduced into the subterranean reservoir above matrix pressure. The fracturing fluid maintains existing clay stabilization, fractures the reservoir, and inhibits swelling of the clay newly exposed during fracture. As used herein, the term "matrix pressure" refers to pressures below the fracture pressure of the formation, that is, pressures that are insufficient to create or extend fractures within the subterranean formation. In these methods, the leading edge fluid may comprise a higher level of clay stabilizer solution than is present in the fracturing fluid, such that as the leading edge fluid is pushed into the formation ahead of the fracturing fluid, it contains a sufficient amount of clay stabilizer solution such that even the clays contacted by the leading edge fluid at its farthest progression from the wellbore are sufficiently treated.

Other suitable methods for stabilizing a formation containing water-sensitive minerals may include the following steps. First, a leading-edge fluid comprising a concentrated clay stabilizer solution is introduced into the subterranean reservoir above matrix pressure. Then, a fracturing fluid comprising a clay stabilizer solution is introduced into the subterranean reservoir. The fracturing fluid maintains existing clay stabilization and inhibits swelling of the clay newly exposed during fracture. In these methods, the leading edge fluid may comprise a higher level of clay stabilizer solution than is present in the fracturing fluid, such that as the leading edge fluid is forced into the formation above matrix pressure and as it is further pushed into the formation by the fracturing fluid, it contains a sufficient amount of clay stabilizer solution such that even the clays contacted by the leading edge fluid at its farthest progression from the wellbore are sufficiently treated.

The optimal concentration of clay stabilizer solution used in the leading-edge fluid can be determined by one skilled in the art. One suitable method for determining the optimal concentration of clay stabilizer to be used in the leading-edge fluid involves a four step analysis. First, determine the total clay concentration and clay type from known methods including, but not limited to, x-ray analysis and scanning electron microscopy. Second, determine the cation exchange capacity of a formation sample including, but not limited to, Langmuir adsorption isotherms, surface roughness, and cation exchange capacity. Third, estimate the generated surface area during the fracture treatment using known simulation methods. And finally, estimate the clay stabilizer mass required using the values determined in the first three steps.

An approximate concentration of clay stabilizer solution used in the leading-edge fluid can be determined by one skilled in the arts by generally characterizing the degree to which the clays in the subterranean formation are water sensitive; e.g., very water sensitive, moderately water sensitive, or minimally water sensitive. Additionally, one skilled in the arts may be able to estimate the water-sensitive nature of the clays in the subterranean formation based on known characteristics of the reservoir and nearby wells. Because the leading-edge fluid enters the formation first, it contacts formation surfaces, including water-sensitive clays, before other liquids are placed into the formation. That is, the leading-edge fluid is highly likely to encounter non-stabilized clays. The depletion of stabilizing components in the leading-edge fluids, as to contacts new surface, may be extensive. Therefore, a high concentration of clay stabilizer solution in the leading-edge fluid may effectively stabilize clays as the fluid penetrates the subterranean formation and maintains a clay stabilizer solution concentration above the necessary amount to stabilize clays deeper into the subterranean formation.

Figure 1B:
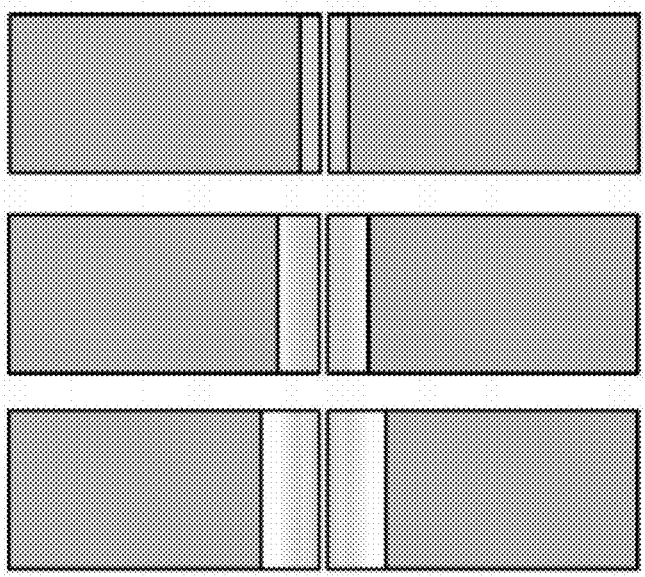
FIG. 1b is a representation of the concentration of the stabilizing components within the clay stabilizer solution when injected into the subterranean reservoir at three different time points after injection of the clay stabilizer solution according to the current state-of-the-art methods.
Figure 2A:
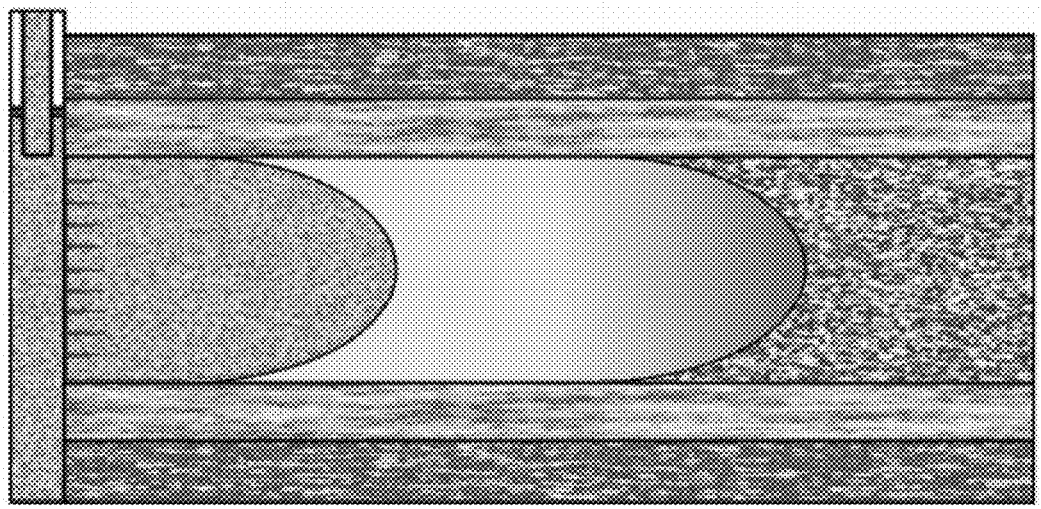
FIG. 2a is a cross-sectional representation of a subterranean reservoir that has received clay stabilizer solution according to the method presented herein.
Figure 2B:
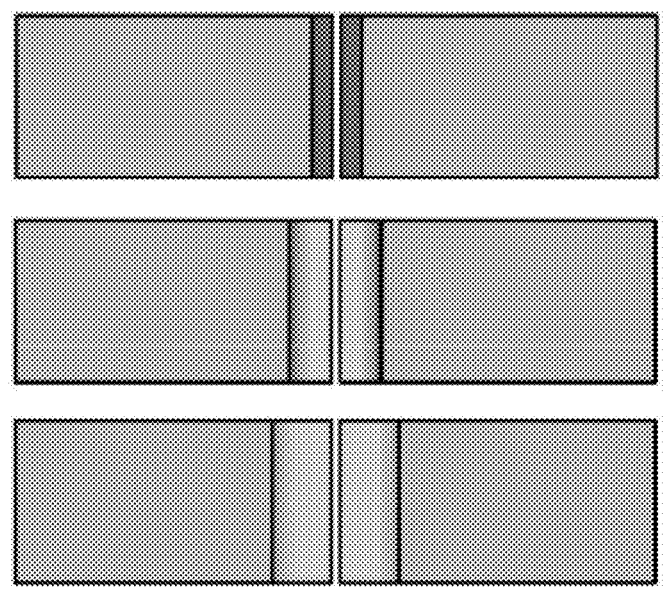
FIG. 2b is a representation of the concentration of the stabilizing components within the clay stabilizer solution when injected into the subterranean reservoir at three different time points after injection of the clay stabilizer solution according to the method presented herein.

FIG. 1a is a cross-sectional representation of a subterranean reservoir that has received clay stabilizer solution according to the prior art method of providing a bolus of clay stabilizer solution in the treatment fluid being placed. FIG. 1b shows this same prior art placement at three different times as the clay stabilizer solution progresses into the formation. FIGS. 2a and 2b show the same progression according to the method of the present invention wherein a leading edge fluid having a high level of clay stabilizer solution is the first fluid placed into the formation. In both FIGS. 1b and 2b the concentration of the stabilizing components at the leading-edge of the clay stabilizer solution decreases as the clay stabilizer solution migrates through the subterranean reservoir. However, because the concentration of the stabilizing components is higher in the leading-edge fluid shown in 2b, it can be seen that the treatment of the present invention allows for the stabilization of clays further into the formation.

A preferred method for stabilizing the clays calls for the concentration of the stabilizing components in the leading-edge fluid to range from a lower limit of greater than about 0.1%, 0.5%, 1%, 2%, 5%, or 10% to an upper limit of less than about 15%, 10%, or 5% v/v, where the concentration may range from any lower limit to any upper limit and encompass any subset between the upper and lower limits. More water-sensitive minerals may require more concentrated clay stabilizer solution in the leading-edge fluid relative to the fracturing fluid.

The fluid placed after the leading-edge fluid (such as a fracturing fluid or a matrix may exhibit lower levels of clay stabilizer solution than required in traditional methods. Because the leading-edge fluid has been placed before the later treatment fluid, so long as the interval to be treated by the treatment fluid has been fully contacted by the leading-edge fluid, the treatment fluid needs not act as the primary stabilization fluid. Rather, the clay stabilizer solution in the treatment fluid following the leading edge fluid is used to stabilize any newly exposed clays during the treatment. Therefore, the concentration of the stabilizing components in the fracturing fluid is significantly lower than in the leading edge fluid. A preferred method for stabilizing the clays calls for the concentration of the stabilizing components in the fracturing fluid to range from a lower limit of greater than about 0.001%, 0.01%, 0.1%, or 1% to an upper limit of less than about 5%, 2%, 1%, or 0.1% v/v, where the concentration may range from any lower limit to any upper limit and encompass any subset between the upper and lower limits.

I. Stabilizing Components

Nearly all stabilizing components suitable for use in subterranean operations may be used in the methods of the present invention. Examples of suitable clay stabilizing components and mechanisms of stabilization may be found in U.S. Pat. Nos. 7,740,071, 5,197,544, 4,366,073, and U.S. Patent Application Publication Number 2004/0235677, each of which is incorporated herein by reference. Stabilizing components may interact with the surfaces, interlayers, and core of clays and clay platelets to mitigate or reverse clay hydration and swelling.

Charges on the clay and clay platelets may permit interaction with dissolved mineral ions in aqueous fluids, both native and non-native to the formation. The net negative charge on a platelet may be typically balanced mainly by sodium ions, although other inorganic cations may also be present in minor amounts. The cations, or charge-balancing ions, associate with the platelet faces are termed "exchangeable" as they can be readily substituted with other cations when presented to the clay platelets. Each macroscopic clay particle may be comprised of many thousands of sandwiched clay platelets, each having exchangeable cations and a layer of water therebetween. When clay and water are mixed, water may penetrate between the platelets, forcing them further apart. The cations present at the platelet faces may begin to diffuse away from platelet faces. Further, the amount of water contained within the platelets may be dependant upon the pressure under which the clay is located, typically the depth of the clay deposit in the subterranean formation. Mechanisms of clay hydration may include surface hydration through bonding of water molecules to oxygen atoms on the surface of clay platelets; ionic hydration through hydration of interlayer cations with surrounding shells of water molecules; and osmotic hydration, which occurs in some clays after they are completely surface and ionically hydrated, usually at 100% humidity. Suitable stabilizing components include salts, polymers, resins, soluble organic stabilizing compounds, and combinations thereof.

The stabilizing components can be the same or different chemical compositions within the leading-edge fluid and fracturing fluid. When more than one stabilizing component is used, the stabilizing components can be at the same or different concentrations relative to one another within the leading-edge fluid and fracturing fluid. The preparation of a clay stabilizer solution is expected to be according to a preferred preparation embodiment for the clay stabilizer solution, which is known by one skilled in the arts.

A. Suitable Salts

Nearly all salts and salt combinations known in the art that are suitable for use in subterranean operations may be used in the methods of the present invention. The term "inorganic acid" refers to any acidic compound that does not comprise a carbon atom. Examples of suitable salts of inorganic acids include, but are not limited to, sodium chloride, calcium chloride, potassium chloride, sodium bromide, calcium bromide, potassium bromide, sodium sulfate, calcium sulfate, sodium phosphate, calcium phosphate, sodium nitrate, calcium nitrate, cesium chloride, cesium sulfate, cesium phosphate, cesium nitrate, cesium bromide, potassium sulfate, potassium phosphate, potassium nitrate, and the like. When included, the leading-edge fluid or the fracturing fluid of the present invention may comprise any combination of inorganic acids and/or salts thereof. The one or more inorganic acids (or salts thereof) may be present in the leading-edge fluid or the fracturing fluid useful in the methods of the present invention in an amount sufficient to provide the desired effect. The amount of the organic acid(s) (or salts thereof) included in the leading-edge fluid or the fracturing fluid may depend upon the particular acid and/or salt used, as well as other components of the leading-edge fluid or the fracturing fluid, and/or other factors that will be recognized by one of ordinary skill in the art with the benefit of this disclosure.

B. Suitable Polymers and Resins

Nearly all polymers and resins known in the art that are suitable for use in subterranean operations may be used in the methods of the present invention, including salt thereof. The polymers and resins can be synthetic or natural and non-hardenable or hardenable.

Polymers and resins suitable for use in the present invention include all polymers, resins, and combinations thereof known in the art that stabilize clay. Examples of polymers and resins suitable for use in the present invention include, but are not limited to: acrylic acid polymers; acrylic acid ester polymers; acrylic acid derivative polymers; acrylic acid homopolymers; acrylic acid ester homopolymers (such as poly(methyl acrylate), poly(butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; acrylic acid/acrylamido-methyl-propane sulfonate co-polymers; bisphenol A diglycidyl ether resins; butoxymethyl butyl glycidyl ether resins; bisphenol A-epichlorohydrin resins; bisphenol F resins; polyepoxide resins; novolak resins; polyester resins; phenol-aldehyde resins; urea-aldehyde resins; furan resins; urethane resins; glycidyl ether resins; other epoxide resins; polyacrylamide; partially hydrolyzed polyacrylamide; copolymers of acrylamide and acrylate; carboxylate-containing terpolymers; tetrapolymers of acrylate; galactose; mannose; glucoside; glucose; xylose; arabinose; fructose; glucuronic acid; pyranosyl sulfate; guar gum; locust bean gum; tara; konjak; tamarind; starch; cellulose; karaya; xanthan; tragacanth; carrageenan; polycarboxylates such as polyacrylates and polymethacrylates; polyacrylamides; methylvinyl ether polymers; polyvinyl alcohols; polyvinylpyrrolidone; CLA-STA® XP, a water-soluble cationic oligomer (available from Halliburton Energy Services in Duncan, Okla.); CLA-STA® FS, a polymer (available from Halliburton Energy Services in Duncan, Okla.); and CLA-WEB®, a stabilizing additive (available from Halliburton Energy Services in Duncan, Okla.); derivatives thereof; salts thereof; and combinations thereof.

The one or more polymers or resins (or salts thereof) may be present in the leading-edge fluid or the fracturing fluid in the methods of the present invention in an amount sufficient to provide the desired effect. The amount of the polymer or resin (or salts thereof) included in the leading-edge fluid or the fracturing fluid may depend upon the particular polymer, resin, and/or salt used, as well as other components of the leading-edge fluid or the fracturing fluid, and/or other factors that will be recognized by one of ordinary skill in the art with the benefit of this disclosure.

C. Suitable Organic Stabilizing Compounds

Nearly all organic stabilizing compounds and combinations thereof known in the art that are suitable for use in subterranean operations may be used in the methods of the present invention.

Examples of suitable organic acids include, but are not limited to, formic acid, acetic acid, citric acid, glycolic acid, lactic acid, 3-hydroxypropionic acid, a C 1 to C 12 carboxylic acid, an aminopolycarboxylic acid such as hydroxyethylethylenediamine triacetic acid, and combinations thereof. Alternatively or in combination with one or more organic acids, the leading-edge fluid or the fracturing fluid of the present invention may comprise a salt of an organic acid. A "salt" of an acid, as that term is used herein, refers to any compound that shares the same base formula as the referenced acid, but one of the hydrogen cations thereon is replaced by a different cation (e.g., an antimony, bismuth, potassium, sodium, calcium, magnesium, cesium, or zinc cation). Examples of suitable salts of organic acids include, but are not limited to, sodium acetate, sodium formate, calcium acetate, calcium formate, cesium acetate, cesium formate, potassium acetate, potassium formate, magnesium acetate, magnesium formate, zinc acetate, zinc formate, antimony acetate, antimony formate, bismuth acetate, and bismuth formate. The one or more organic acids (or salts thereof) may be present in the leading-edge fluid or the fracturing fluid in the methods of the present invention in an amount sufficient to provide the desired effect. The amount of the organic acid(s) (or salts thereof) included in the leading-edge fluid or the fracturing fluid may depend upon the particular acid and/or salt used, as well as other components of the leading-edge fluid or the fracturing fluid, and/or other factors that will be recognized by one of ordinary skill in the art with the benefit of this disclosure.

A variety of monomers (or salts thereof) are suitable for use as an organic stabilizing compound in the present invention. Examples of suitable monomers include, but are not limited to, acrylic acid, methacrylic acid, acrylamide, methacrylamide, 2-methacrylamido-2-methylpropane sulfonic acid, dimethylacrylamide, vinyl sulfonic acid, N,N-dimethylaminoethyl methacrylate, 2-triethylammoniumethylmethacrylate chloride, N,N-dimethyl-aminopropyl-methacryl-amide, methacrylamidepropyltriethylammonium chloride, N-vinyl pyrrolidone, vinyl-phosphonic acid, methacryloyloxyethyl trimethylammonium sulfate, and combinations thereof. The one or more monomers (or salts thereof) may be present in the leading-edge fluid or the fracturing fluid in the methods of the present invention in an amount sufficient to provide the desired effect. The amount of the monomer(s) (or salts thereof) included in the leading-edge fluid or the fracturing fluid may depend upon the particular monomer and/or salt used, as well as other components of the leading-edge fluid or the fracturing fluid, and/or other factors that will be recognized by one of ordinary skill in the art with the benefit of this disclosure.

III. Leading-Edge Base Fluids

The leading-edge fluid and fracturing fluid can be prepared in an aqueous base fluid according to the preferred method of the stabilizing components used. Aqueous base fluids suitable for use in the leading-edge fluid or fracturing fluid of the present invention may comprise fresh water, saltwater (e.g., water containing one or more salts dissolved therein), brine (e.g., saturated salt water), seawater, or combinations thereof. Generally, the water may be from any source, provided that it does not contain components that might adversely affect the stability and/or performance of the leading-edge fluid or the fracturing fluid of the present invention. In certain embodiments, the density of the aqueous base fluid can be adjusted, among other purposes, to provide additional particulate transport and suspension in the leading-edge fluid or the fracturing fluid used in the methods of the present invention. In certain embodiments, the pH of the aqueous base fluid may be adjusted (e.g., by a buffer or other pH adjusting agent), among other purposes, to reduce the viscosity of the leading-edge fluid or fracturing fluid. In these embodiments, the pH may be adjusted to a specific level, which may depend on, among other factors, the types of gelling agents, acids, and other additives included in the leading-edge fluid or fracturing fluid. One of ordinary skill in the art, with the benefit of this disclosure, will recognize when such density and/or pH adjustments are appropriate.

The leading-edge fluid and a later placed treatment fluid (such as a fracturing fluid) can further comprise additives including, but not limited to, surface modification agents, zeta potential modification agents, friction reducing agents, proppants, weighing agents, viscosifying agents, self-degradable polymer particulates, hydratable gel particulates, consolidating agents, tackifying agents, acids, and combinations thereof.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method of stabilizing a subterranean formation containing water-sensitive minerals comprising:
   introducing a leading-edge fluid comprising a first base fluid and a first clay stabilizer wherein the first clay stabilizer is present in the first base fluid at a first concentration;
   then, directly after the leading-edge fluid, introducing a treatment fluid comprising a second base fluid and a second clay stabilizer wherein the second clay stabilizer is present in the second base fluid at a second concentration; and
   wherein the first concentration of the first clay stabilizer is higher than the second concentration of the second clay stabilizer; and
   wherein the first clay stabilizer and the second clay stabilizer each independently comprise at least one selected from the group consisting of a polymer, a resin, a soluble organic stabilizing compound, and any combination thereof.

2. The method of claim 1, wherein the leading-edge fluid further comprises an additive selected from the group consisting of a friction reducing agent, a proppant, a weighing agent, a viscosifying agent, a self-degradable polymer particulate, a hydratable gel particulate, an acid, and any combination thereof.

3. The method of claim 1, wherein the first concentration of the first clay stabilizer is about 0.1% to about 15% v/v of the leading-edge fluid.

4. The method of claim 1, wherein the first base fluid is an aqueous fluid selected from the group consisting of fresh water, salt water, sea water, brine, produced water, and any combination thereof.

5. The method of claim 1, wherein the treatment fluid further comprises an additive selected from the group consisting of a surface modification agent, a zeta potential modification agent, a friction reducing agent, a proppant, a weighing agent, a viscosifying agent, a self-degradable polymer particulate, a hydratable gel particulate, a consolidating agent, a tackifying agent, an acid, and any combination thereof.

6. The method of claim 1, wherein the second concentration of the second clay stabilizer is about 0.001% to about 5% v/v treatment fluid.

7. The method of claim 1, wherein the second base fluid is an aqueous fluid selected from the group consisting of fresh water, salt water, sea water, brine, produced water, and any combination thereof.

8. The method of claim 1, wherein the first clay stabilizer and the second clay stabilizer are the same composition.

9. The method of claim 1, wherein the first clay stabilizer and the second clay stabilizer are different compositions.

10. The method of claim 1, wherein the first clay stabilizer comprises the polymer.

11. The method of claim 1, wherein the first clay stabilizer comprises the resin.

12. The method of claim 1, wherein the first clay stabilizer comprises the soluble organic stabilizing compound.

13. The method of claim 1, wherein the first clay stabilizer and the second clay stabilizer are the same composition; wherein the first concentration of the first clay stabilizer is about 0.1% to about 15% v/v of the leading-edge fluid; and wherein the second concentration of the second clay stabilizer is about 0.001% to about 5% v/v treatment fluid.

14. The method of claim 13, wherein the first concentration is about 100 times to about 10,000 times greater than the second concentration.

15. A method of stabilizing a subterranean formation containing water-sensitive minerals comprising:
    introducing a leading-edge fluid into a subterranean formation above a matrix pressure,
       wherein the leading-edge fluid comprises a first base fluid and a first clay stabilizer and wherein the first clay stabilizer is present in the first base fluid at a first concentration; and
    then, directly after the leading-edge fluid, introducing a treatment fluid into the subterranean formation above the matrix pressure,
       wherein the treatment fluid comprises a second base fluid and a second clay stabilizer and wherein the second clay stabilizer is present in the second base fluid at a second concentration, and
       wherein the first concentration of the first clay stabilizer is higher than the second concentration of the second clay stabilizer; and
       wherein the first clay stabilizer and the second clay stabilizer each independently comprise at least one selected from the group consisting of a polymer, a resin, a soluble organic stabilizing compound, and any combination thereof.

16. The method of claim 15, wherein the first concentration of the first clay stabilizer is about 0.1% to about 15% v/v of the leading-edge fluid.

17. The method of claim 15, wherein the second concentration of the second clay stabilizer is about 0.001% to about 5% v/v of the treatment fluid.

18. The method of claim 15, wherein the first clay stabilizer and the second clay stabilizer are the same composition.

19. The method of claim 15, wherein the first clay stabilizer and the second clay stabilizer are different compositions.

20. A method comprising:
    introducing a leading-edge fluid into a subterranean formation below a matrix pressure, the leading-edge fluid comprising a clay stabilizer at about 5% to about 15% v/v of the leading-edge fluid;
    then, directly after the leading-edge fluid, introducing a fracturing fluid into the subterranean formation above the matrix pressure, the fracturing fluid comprising the clay stabilizer at about 0.001% to about 1% v/v of the fracturing fluid; and
    wherein the clay stabilizer comprises at least one selected from the group consisting of a polymer, a resin, a soluble organic stabilizing compound, and any combination thereof.

* * * * *